No. 755,826. Patented March 29, 1904.

UNITED STATES PATENT OFFICE.

ROBERT SIMON WOODSON, OF BOULDER, COLORADO.

WELDING COMPOUND.

SPECIFICATION forming part of Letters Patent No. 755,826, dated March 29, 1904.

Application filed December 15, 1902. Serial No. 135,319. (No specimens.)

*To all whom it may concern:*

Be it known that I, ROBERT SIMON WOODSON, a citizen of the United States, residing at Boulder, in the county of Boulder and State of Colorado, have invented a new and useful Welding Compound, of which the following is a specification.

This invention relates to welding compounds.

The object of the invention is to provide a compound for use in welding steel or iron which shall be thoroughly efficient as a reducing agent and which shall prevent the forming of scales upon the surfaces to be welded.

With the above and other objects in view, as will appear as the nature of the invention is better understood, the same consists in the novel welding compound hereinafter fully described and claimed.

The compound consists of natural silica or silicon dioxid and commercial borax, the two ingredients being ground together to a fine powder. Any form of natural silica may be used; but quartz rock or sand are the preferred forms on account of their abundance and wide natural distribution. For welding of steel the compound will consist of six and two-thirds per cent., by weight, of borax and ninety-three and one-third per cent., by weight, of natural silica, and for welding wrought-iron the compound will be composed of about three per cent. of borax, by weight, and about ninety-seven per cent. of natural silica, by weight.

In the use of the compound it is sprinkled upon the surfaces to be welded in the manner commonly observed, and in the operation of welding the formation of scales on the surfaces of the metal will positively be obviated, thereby insuring a perfect and homogeneous weld.

Having thus described the invention, what I claim is—

A welding compound consisting of borax from three per cent. to six and two-thirds per cent. by weight and silicon dioxid from ninety-seven per cent. to ninety-three and one-third per cent. by weight, the ingredients being in pulverized form and thoroughly intermingled.

In testimony that I claim the foregoing as my own I have hereto affixed my signature in the presence of two witnesses.

ROBERT SIMON WOODSON.

Witnesses:
WM. McGINNIES,
BRUCE BURGESS.